Jan. 3, 1967   R. S. BLOUGH   3,295,500
AUTOMATIC FEED WEIGHING AND LIQUID DISTRIBUTING
APPARATUS FOR LIVESTOCK
Filed March 25, 1964   8 Sheets-Sheet 4
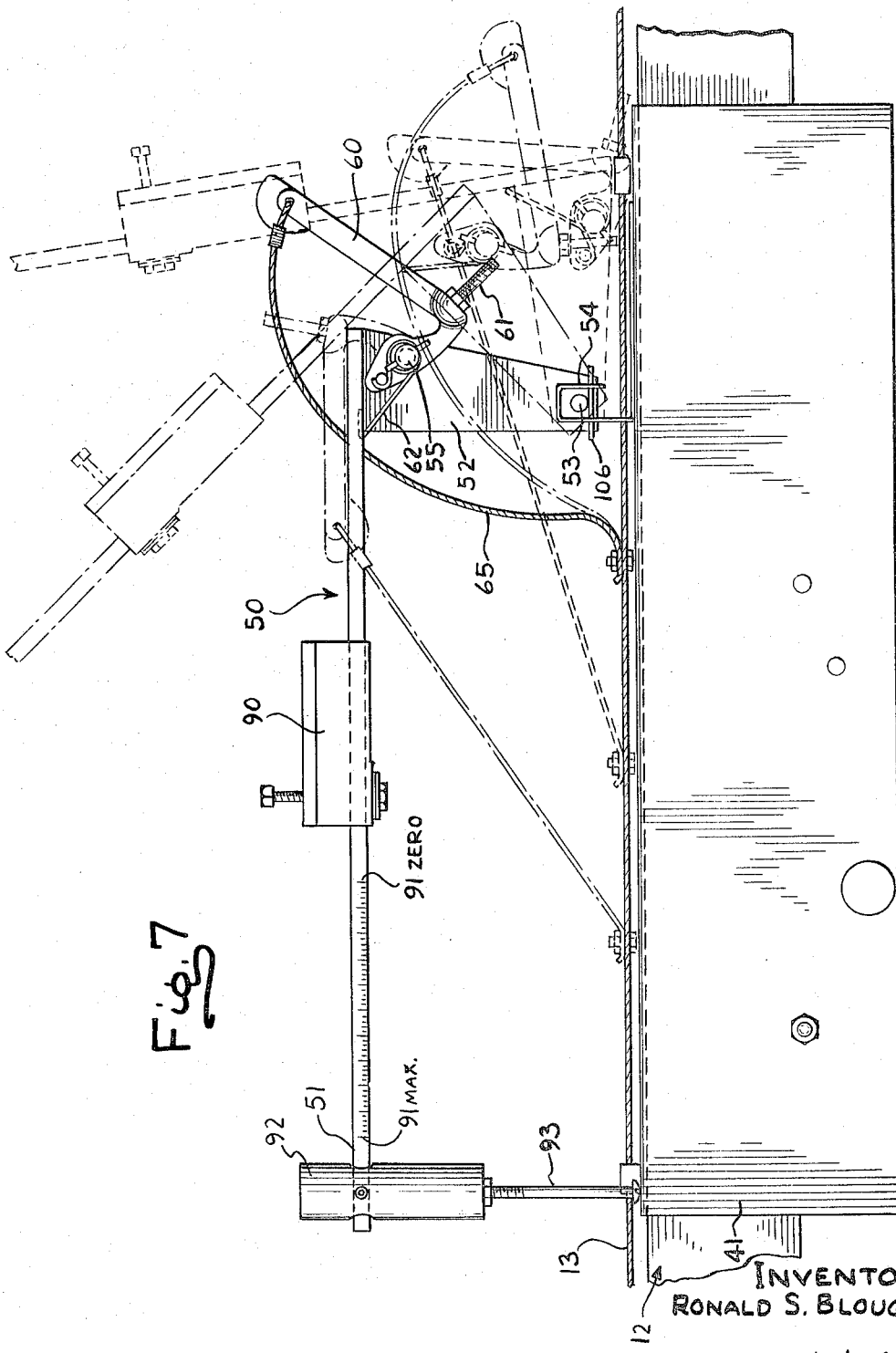
INVENTOR
RONALD S. BLOUGH
by: Wolfe, Hubbard, Voit & Osann
ATTYS.

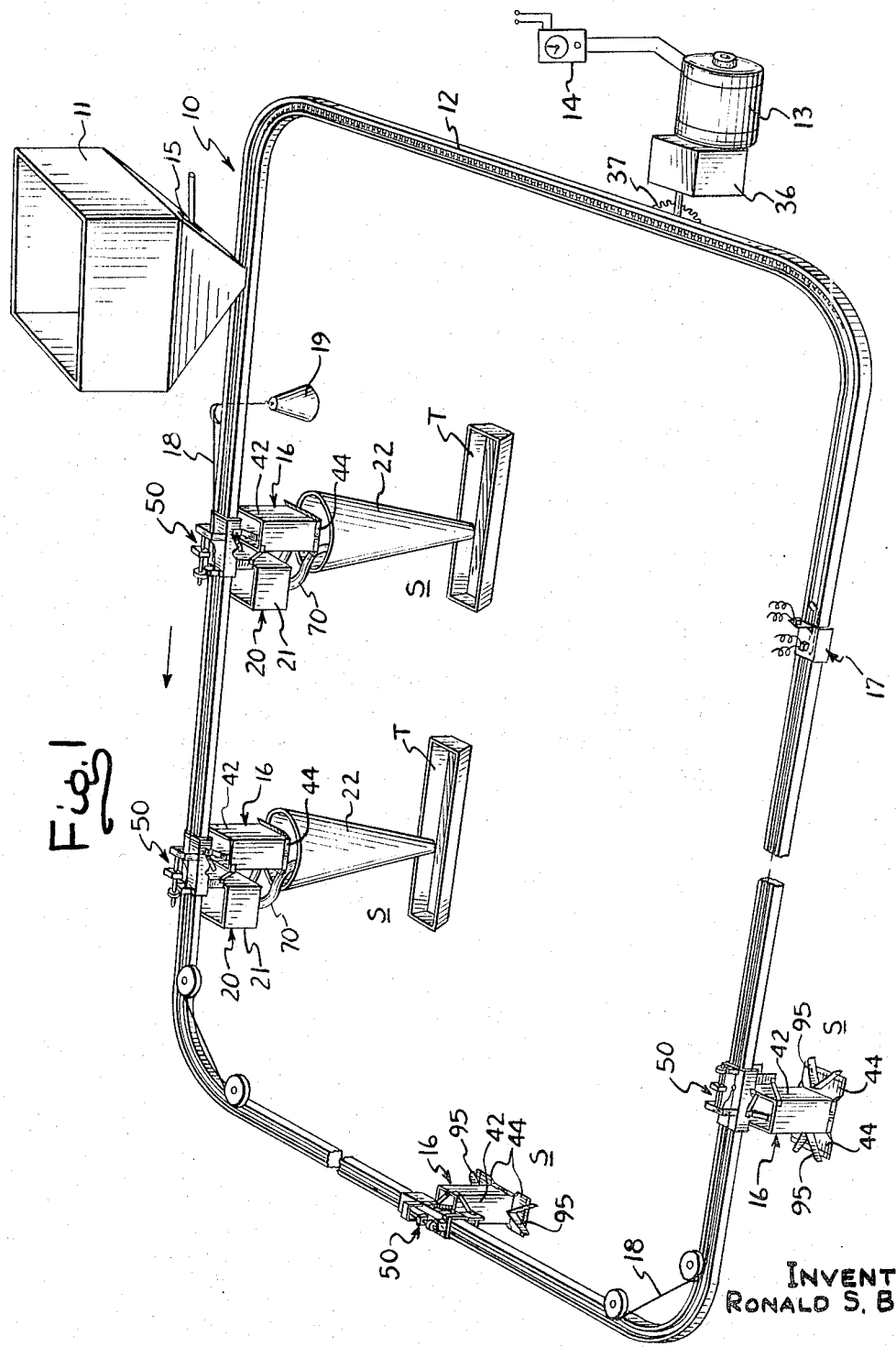

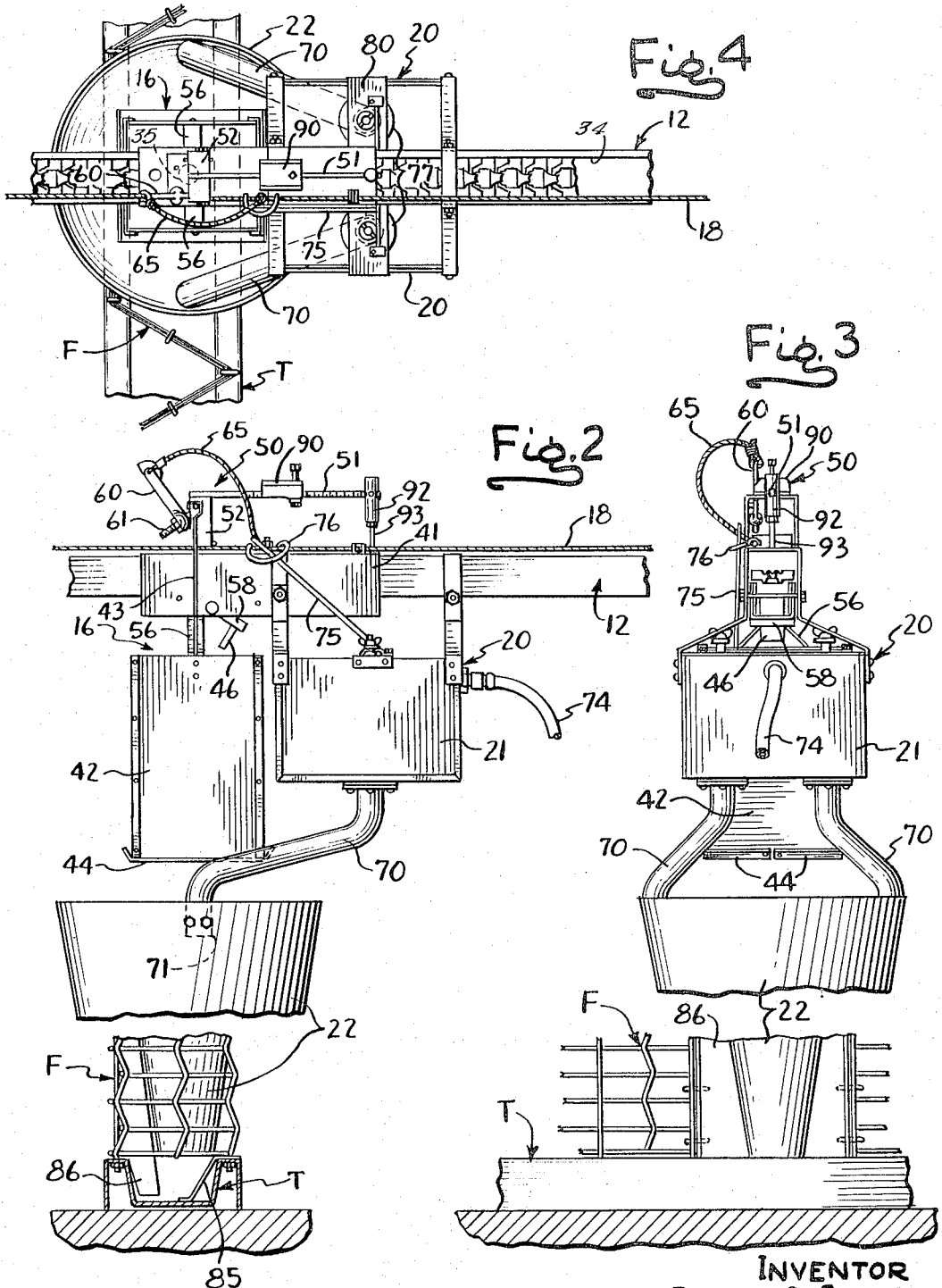

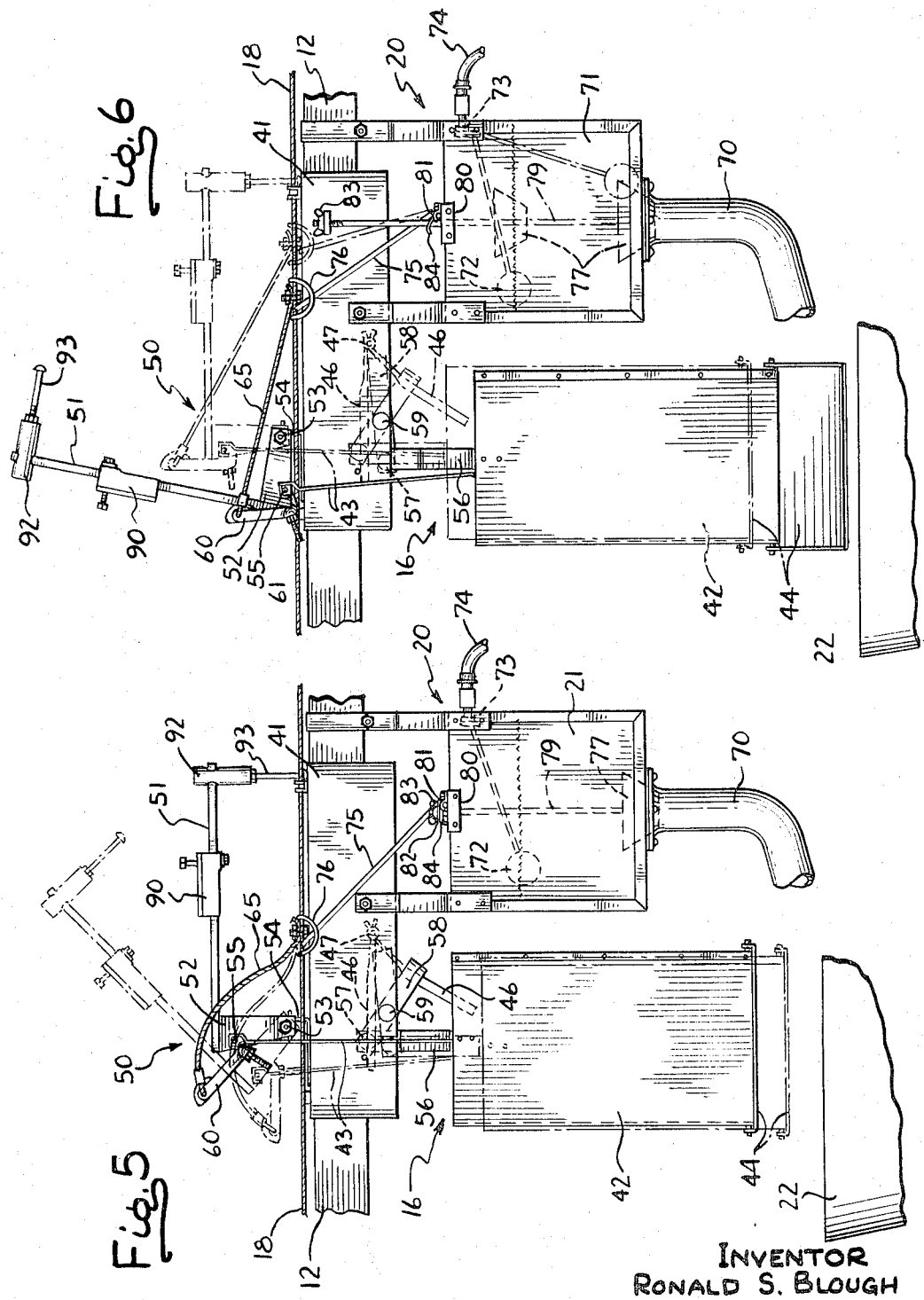

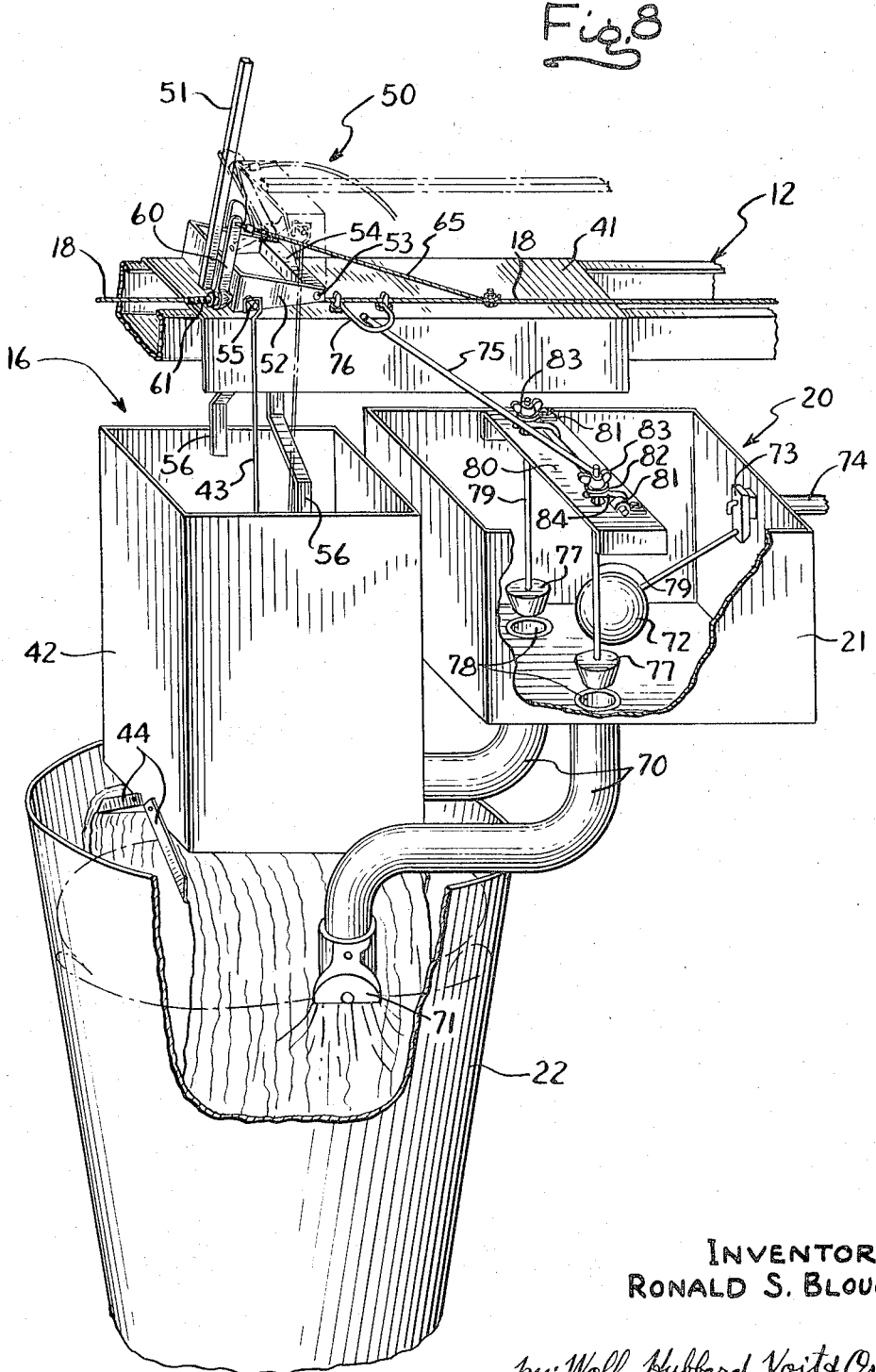

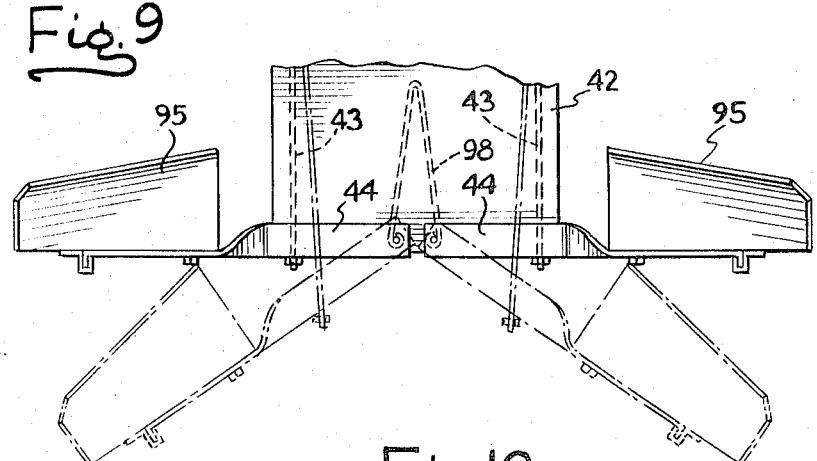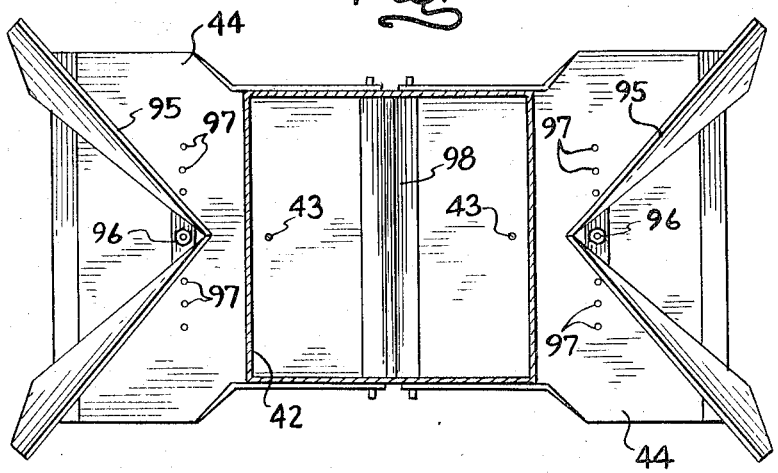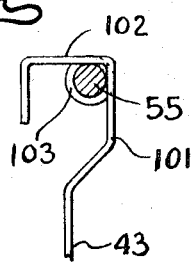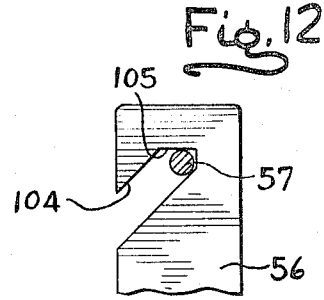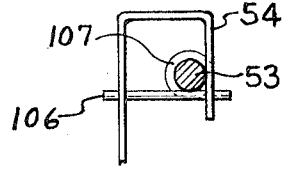

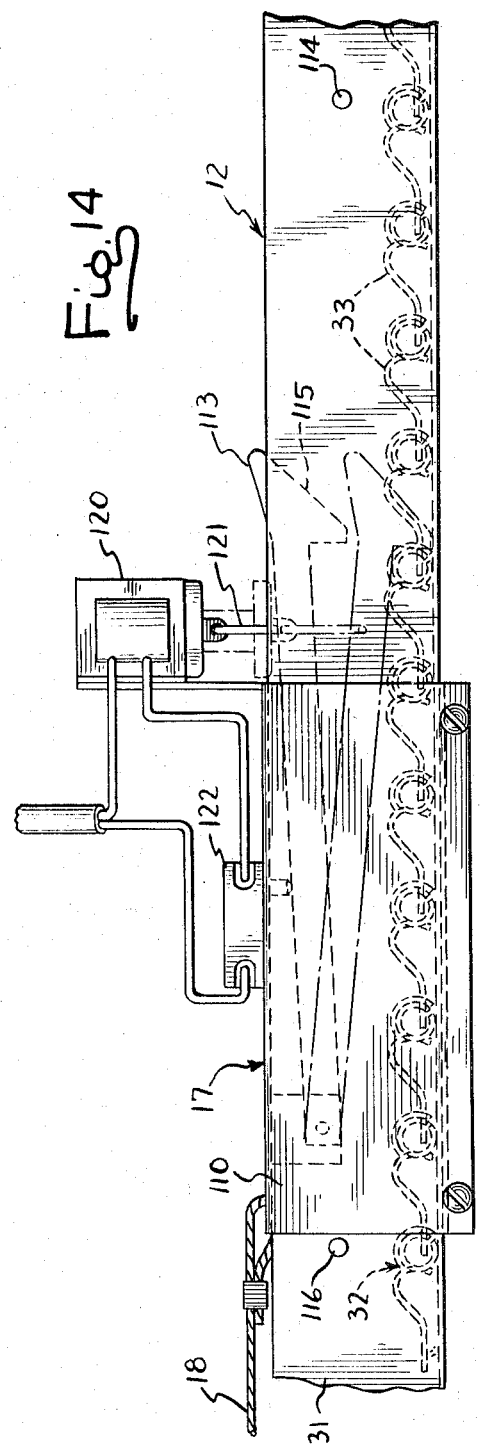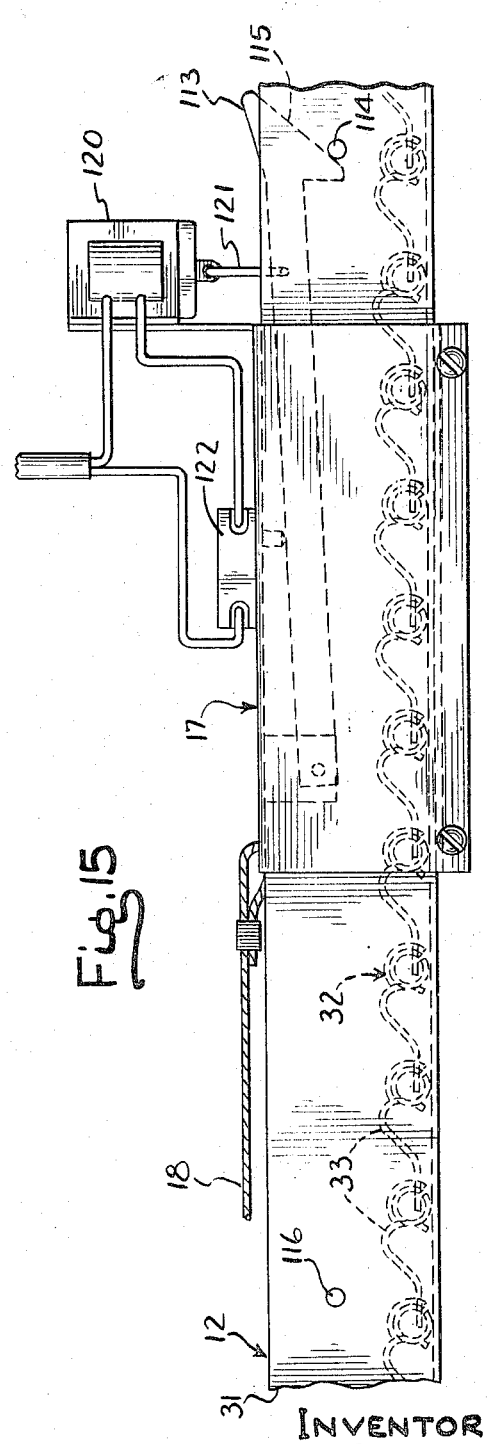

Jan. 3, 1967 R. S. BLOUGH 3,295,500
AUTOMATIC FEED WEIGHING AND LIQUID DISTRIBUTING
APPARATUS FOR LIVESTOCK
Filed March 25, 1964 8 Sheets-Sheet 8
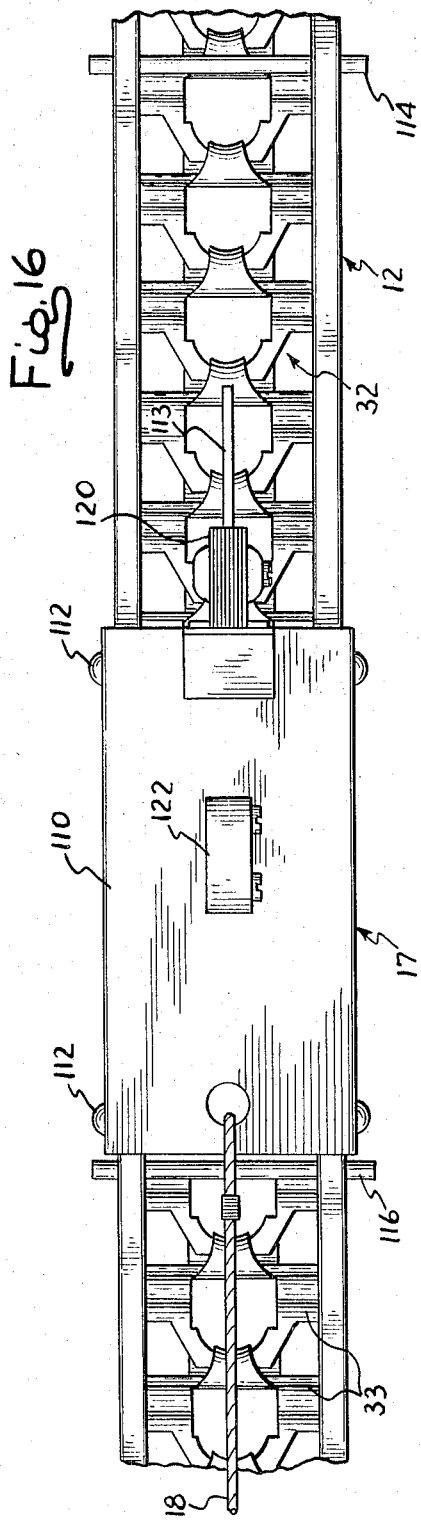
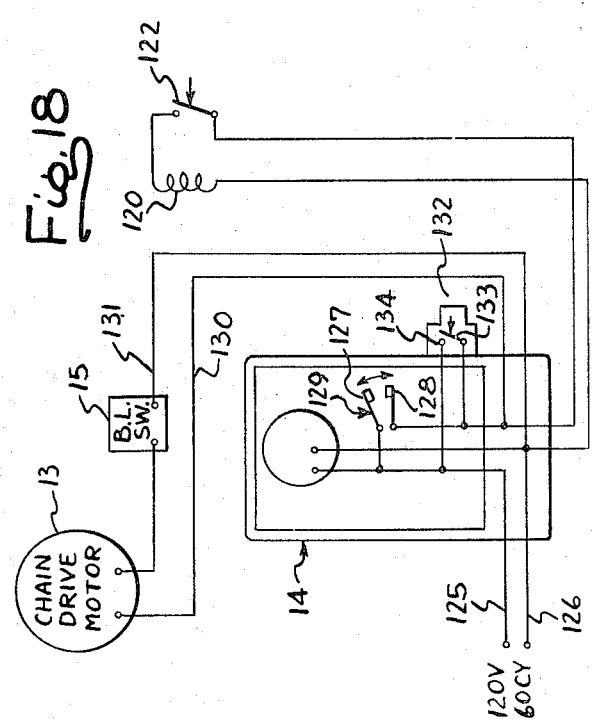
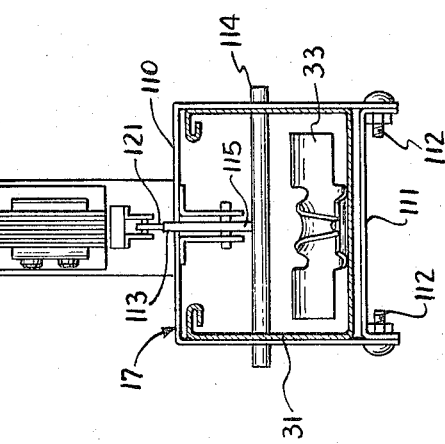
INVENTOR
RONALD S. BLOUGH
by: Wolfe, Hubbard, Voit & Osann
ATTYS.

United States Patent Office 3,295,500
Patented Jan. 3, 1967

3,295,500
AUTOMATIC FEED WEIGHING AND LIQUID DISTRIBUTING APPARATUS FOR LIVESTOCK
Ronald S. Blough, Fairfield, Iowa, assignor to Fairfield Engineering and Manufacturing Company, Fairfield, Iowa, a corporation of Iowa
Filed Mar. 25, 1964, Ser. No. 354,736
14 Claims. (Cl. 119—51.5)

This application is a continuation-in-part of application Serial No. 270,068, filed April 2, 1963, now Patent No. 3,185,230.

The present invention relates generally to an apparatus for feeding livestock and more particularly concerns mechanism for automatically weighing controlled portions of feed at one or more livestock feeding stations, and for distributing the feed in either dry or liquid form at the feeding stations.

In recent years there has been a growing consumer demand for high quality, lean-type meat at reasonable prices. One of the major improvements in the production of meat type animals results from proper breeding and selection techniques to increase the size of the lean meat portion on animal carcasses. The production of lean meat animals also requires close control and accurate proportioning of each animal's feed in order to get proper growth and production of lean tissues without excess back-fat and internal fatty tissues.

It has also been found that by limiting the quantity of feed per feeding and by feeding livestock more often, the animals consume all of the feed which is provided and also have more efficient growth rates. This results in saving the feed that the animals normally waste, which often amounts to 10% or more of the total feed provided. In addition, distributing controlled amounts of feed in liquid form is also advantageous in promoting the efficient growth of some types of livestock, particularly swine. However, more frequent feeding of controlled amounts of dry feed and proper mixing of liquid feed require additional time and labor to accurately control and distribute the desired quantities at regular time intervals unless new distribution systems and techniques are developed.

Accordingly, the primary aim of the present invention is to provide a novel apparatus for automatically weighing and distributing accurately controlled portions of feed at one or more livestock feeding stations. It is a related object to provide apparatus which permits weighed portions of dry feed to be distributed in liquid form at the feeding stations.

It is a further object to provide a simple and inexpensive weighing mechanism for dropping controlled portions of feed at various points along a feed distribution conveyor. An additional object is to provide an accurate, yet rugged, mechanism for selectively changing the weight of feed to be dropped at any particular feeding station.

An important object is also to insure that adequate and uniform mixing occurs when the feed is distributed in liquid form.

Another object of the invention is to provide for automatically starting the feed weighing and distributing mechanism at pre-set intervals and to provide means for automatically stopping the mechanism after feed has been distributed to the feeding stations. It is also an object to provide for sequentially discharging the feed at each feeding station or to permit simultaneous feeding at all stations to achieve surprise feeding.

It is yet another object to provide means for manually starting the feed distribution mechanism independent of the automatically controlled distribution sequence, and also to provide means for automatically disengaging the feeding mechanism when the supply of feed is exhausted.

A more particular object is to construct each of the individual weighing devices for quick tripping from the cocked position as soon as the preselected weight of feed is delivered in order to shut off the supply of feed from the conveyor. It is also an object to provide a mechanism for automatically cocking the weighing devices from the power available in the conveyor mechanism.

Still another object is to provide such a dry feed weighing and liquid feed distributing device which may be easily and economically constructed using mass production techniques and yet which is accurate and rugged in operation and may be easily and conveniently adjusted to overcome minor misalignments and abuse which may occur in installation or operation.

Other objects and advantages of the invention will become apparent upon reading the following detailed description and upon reference to the drawings in which:

FIGURE 1 is a schematic illustration of a feed distribution arrangement employing the novel controlled feed weighing apparatus and liquid feed distributing apparatus of the present invention;

FIG. 2 is an enlarged fragmentary side elevation of one of the dry feed weighing and liquid feed distributing units shown in FIG. 1;

FIG. 3 is an enlarged fragmentary rear elevation of the unit shown in FIG. 2;

FIG. 4 is a plan view of the unit shown in FIGS. 2 and 3;

FIGS. 5 and 6 are both further enlarged, partial side elevations of the dry feed weighing and liquid distributing mechanism shown in FIGS. 2-4 with alternate positions of certain parts illustrated by dash lines.

FIG. 7 is a partial side elevation of the weighing mechanism on an even larger scale with certain parts illustrated in various positions by broken lines;

FIG. 8 is an enlarged schematic illustration of the feed weighing and liquid feed distributing mechanism of the invention;

FIGS. 9 and 10 are, respectively, enlarged, partial side elevation and plan views of feed distribution dividers for use with the dry feed weighing mechanism of the invention;

FIGS. 11-13, are, respectively, enlarged fragmentary side views of portions of the feed weighing mechanism illustrating the rolling pivotal connections;

FIGS. 14-17 are, respectively, side, plan and end views of the novel cocking carriage illustrated in FIG. 1; and FIG. 18 is a circuit diagram for the automatic control mechanism.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

*General description*

Turning now to the drawings, there is shown in FIGURE 1 an automatic livestock feed weighing and liquid distributing arrangement 10 constructed in accordance with the present invention. A large hopper or bin 11 is provided for storing bulk quantities of dry feed prepared and mixed of the proper constituents to meet the requirements of the particular livestock being fed. Feed from the bin 11 is distributed through a conveyor 12 which passes over a plurality of livestock feeding stations indicated generally at S. It will be understood that the feeding stations S may be separated by partitions or pens within a building or may be fenced-off enclosures which are located outside the building. Each station may contain one or more animals and the quantity of feed distributed to each station is proportioned accordingly.

The conveyor 12 is driven by a motor 13 which is intermittently energized through an automatic timing clock 14 that may be set to operate the conveying mechanism at preselected intervals. To prevent operation of the conveyor 12 when there is insufficient feed in the bin 11, a safety switch 15 is located near the bottom of the bin and connected in series with the motor energizing circuit. If the quantity of feed in the bin falls below the level of the switch 15, the switch contacts open the motor starting circuit and the conveyor remains inoperative until additional feed is supplied to the bin.

Adjacent each feeding station S the conveyor 12 supports a weighing unit 16 which may be set to weigh and deposit a controlled portion of feed. As feed is distributed from the conveyor 12, each of the successive weighing units 16 automatically trips when a controlled portion of feed has been received by the weighing units 16. After the last weighing unit trips, the distributing cycle is completed and the time clock switch automatically opens to deenergize the motor circuit at the end of the cycle.

In the illustrative embodiment, the conveyor 12 also supports a cocking mechanism 17 which serves to simultaneously discharge and then recock all of the weighing units 16 at the beginning of each operating cycle. The cocking mechanism 17 in this instance is located remotely from the storage bin 11 and the last weighing unit 16 in the direction of travel of the conveyor mechanism 12. An actuating cable 18 couples the cocking mechanism 17 and each of the weighing units 16. For returning the cocking mechanism to its starting position after all of the weighing units have been cocked, a suspended weight 19 is attached to the opposite end of the actuating cable 18.

The present invention also provides for distributing the feed in liquid form at the feeding stations S. For the purpose of illustration only two liquid dispensing devices, indicated generally at 20, have been shown adjacent two of the feed weighing units 16 in FIG. 1. However, additional liquid dispensing devices may be used if desired. Generally, each of the liquid dispensing devices 20 includes a reservoir or tank 21 suspended from the conveyor for holding a supply of liquid such as water and a mixing cone 22 into which liquid from the tank 21 and dry feed from the weighing unit 16 are simultaneously discharged. As the feed and liquid flow down the inside of the cone 22, a thorough mixing action takes place and the liquid feed is then discharged from the lower end of the cone into a suitable trough T or the like.

In the preferred embodiment, each of the liquid dispensing devices 20 is actuated by a linkage connected to the associated feed weighing unit 16. In this way the timing of the discharge of both dry feed and liquid can be controlled and synchronized to achieve the proper mixing action in the cone 22. Similarly, the discharge outlet from the tank 21 is closed incident to recocking the weighing unit 16 thereby allowing the tank to refill with a supply of water for the next discharge.

*The conveyor*

For distributing the feed from the bin 11 to the weighing units 16, it will be appreciated that any suitable conveyor mechanism might be used. Thus, for example, the conveyor may be a drag chain, an auger, a pneumatic conveyor or even a liquid-feed pump conveyor. For the purpose of illustration, only a conveyor of the drag chain type will be herein described in detail; however, it will be understood that any of the other types of conveyor systems might also be used without departing from the present invention.

As shown in FIGS. 14–16 and 17, the illustrative conveyor 12 includes a generally channel-like housing 31 which encloses an endless drag chain 32 comprising a plurality of interlocking links 33. The housing 31, in this instance, is preferably formed of sheet metal and provides a sturdy and rugged support for each of the weighing units 16, water tank 21 and the cocking mechanism 17. The channel-like housing also defines a continuous opening 34 along its upper side which permits convenient inspection of both the feed and the drag chain 32 at any point along the conveyor 12.

The conveyor 12 passes through the lower portion of the storage bin 11 where the drag chain 32 receives feed to be distributed to the weighing units 16. Preferably, the feed from the bin 11 is metered into the conveyor so that it moves along the channel-like housing 31 without overflowing the opening 34. The conveyor continues away from the bin 11 and is located over and above each of the separate livestock feeding stations. To allow feed to drop from the conveyor 12 into the weighing units 16, the housing 31 defines an opening 35 over each weighing unit. Since the drag chain 32 is continuous, the conveyor 12 circles back through the bin 11 after successively distributing feed to each of the weighing units. The chain 32 is driven by the motor 13 through a suitable speed reduction unit 36 and an appropriate drive member such as a gear 37.

*The weighing units*

Referring now to FIGS. 2–7, there are shown several enlarged views of one of the controlled portion weighing units 16. Since all of the weighing units are identical, it will be sufficient to describe a single one of the units in detail. In the preferred embodiment, the weighing unit 16 is rigidly mounted on the conveyor 12 by means of a generally channel-shaped frame 41 which overlies the conveyor housing 31. Suspended below the frame 41 is a weighing tube 42, which is supported by a pair of depending parallel links 43. The tube 42 is thus located to receive feed deposited from the conveyor 12 through the opening 35. For holding feed in the weighing tube 42, a bottom closure is provided which, in the present instance, comprises a pair of side opening doors 44 hinged to the bottom of the tube 42 and connected to the lower ends of the links 43. To shut off the supply of feed to the weighing unit, a door 46 is hinged to the frame 41 by a cross pin 47 and is located to selectively block the opening 35 (see FIG. 5).

In accordance with the present invention, a balancing mechanism 50 is provided for accurately weighing a predetermined amount of feed which has been distributed by the conveyor 12 to the weighing unit 16. In the preferred embodiment, the balancing mechanism 50 is arranged to automatically trip when the feed in the tube 42 reaches a preselected weight, and tripping the balancing mechanism 50 also closes the door 46 to block the flow of additional feed through the opening 35 into the weighing unit 16. The balancing mechanism 50 includes a graduated balance arm 51 secured to an end bracket 52 mounting a pin 53 journalled in a bracket 54 secured to the frame 41. The upper ends of the depending links 43 are also pivotally mounted on a pivot pin 55 secured to the end bracket 52 of the balancing mechanism 50. The pin 55 is spaced horizontally from the pin 53 in the direction away from the balance arm 51. The force for tripping the balancing mechanism is exerted through the depending links 43 due to the combined weight of the tube 42 and the predetermined amount of feed which it contains. The tripping action rotates the end bracket 52 in a counterclockwise direction as seen in FIGS. 5 and 6 about the pivot pin 53 thereby raising the balance arm 51 and lowering the depending links 43.

The initial descending movement of the links 43 also allows the weighing tube 42 to drop away from the conveyor 12 and supporting frame 41. The weighing tube 42 carries a pair of straps 56 which are pivoted on pins 57 to a trip member 58 also pivoted to the frame 41 by pins 59. Downward movement of the straps 56 causes the trip member 58 to rotate in a counterclockwise direction about its pivot pins 59, thereby swinging the door 46 in blocking relation to the opening 35. Further downward movement of the tube 42 is then prevented since the trip member 58 serves as a stop arresting the downward travel of the straps 56.

It is also a feature of the invention that the feed in each of the weighing tubes 42 can be discharged in sequence as the individual balancing mechanisms 50 are tripped, or all of the weighing tubes can be simultaneously tripped to achieve surprise feeding of all of the livestock in the feeding stations S at the same time. Since the surprise feeding sequence is preferred, it will be discussed first.

For preventing premature discharge of the feed from the weighing tube 42 when the balancing mechanism is tripped, the movement of the balance arm 51 and thus the downward movement of the links 43 which actuate the doors 44 is arrested by a stop lever 60. As best seen in FIG. 7, the stop lever 60 is generally L-shaped with its shorter leg pivoted on the pin 55 and its longer leg extending generally upwardly and outwardly from the end bracket 52. The lever 60 also carries an adjustable stop bolt 61 disposed generally in alignment with the short leg of the lever. Preferably, the lever 60 is biased by a helical spring 62 so that the end of the short leg of the lever is urged against the web portion of the end bracket. Thus the free end of the stop bolt 61 is arranged to strike the top of the housing 41 when the balancing mechanism 50 is tripped.

To discharge feed from the tube 42, the stop lever 60 is rotated against the bias of the spring 62 allowing the short end of the lever to strike the housing 41 and thereby permitting the depending links 43 to descend relative to the tube 42 which remains generally stationary. This further downward movement of the links 43 is, of course, carried to the hinged doors 44 and the weight of the feed in the tube 42 urges the doors 44 to their open position discharging the feed from the weighing unit 16 (see FIG. 6). It will now be appreciated that as the balancing mechanism 50 is tripped, first the door 46 is actuated to block the opening 35 thereby preventing additional feed from dropping into the weighing tube 42. Thereafter, the predetermined amount of feed in the tube is discharged by rotating the stop lever 60 to drop the links 43 opening the hinged doors 44.

When it is desired to discharge the feed from the individual weighing tubes, in sequence, it is only necessary to rotate the stop lever 60 against the bias of the spring 62 (see FIG. 7) and lock the lever in this position with a suitable latch, lock bolt or other device (not shown). With the lever 60 locked in place, the balance arm 51 rotates from the dash line position to the solid line position shown in FIG. 6 in a continuous movement. Accordingly, the weighing tube 42 first drops, urging the door 46 into blocking position across the opening 35 and then as the links 43 continue downwardly with respect to the tube, the weight of the feed forces the doors 44 open to discharge the feed.

Rotation of the stop lever 60 against the bias of the spring 62 to permit delayed discharge of the weighing tube 42 for surprise feeding is preferably accomplished through a trip cable 65 interconnecting the long leg of the lever and the cocking cable 18. As previously mentioned, the cocking cable 18 is connected at one end to a cocking carriage 17 disposed on the conveyor 12 away from the last of the weighing units 16 in the direction that the conveyor chain 32 travels. Thus, when the cocking carriage 17 engages the chain 32, as hereinafter explained, the cable 18 is drawn in the direction of chain travel and the trip cable 65 rotates the stop lever to discharge feed from the weighing tube 42. As the cable 18 is drawn further in the direction of chain travel, the trip cable 65 rotates the entire balance arm 51 from the solid line position to the dash line position in FIG. 6 and recocks the balance mechanism 50.

*Liquid dispensing apparatus*

Pursuant to another feature of the present invention, the controlled portions of feed in the weighing tubes 42 may be discharged into mixing cones 22 along with liquid from the supply tanks 21 to distribute the feed in liquid form as is desirable in the case of feeding swine. Liquid, such as water, from the tanks 21 is supplied to the mixing cones 22 by means of discharge conduits 70 which have end deflectors 71 for directing the flow of water down and around the inside surface of the mixing cones. (See FIG. 8) Thus, as the feed in the tubes 42 slides downwardly and outwardly from the sloping doors 44, it intermingles with the swirling flow of water and thoroughly mixes the feed and water as it passes through the mixing cones 22.

For controlling the amount of water that is discharged into the mixing cones 22 with the dry feed, each of the supply tanks is equipped with a float mechanism 72 for operating a valve 73 coupled to a water supply line 74. By adjusting the float level, the amount of water in the tank 21 and thus the amount discharged can be regulated.

To insure that all of the dry feed from each of weighing tubes 42 is mixed with water, the discharge of water from the tanks 21 is preferably actuated by a linkage 75 associated with the feed discharging mechanism. In the illustrated embodiment, the linkage 75 is loosely coupled at one end to the cocking cable 18 by means of a loop 76. Thus, as the cable 18 is drawn in the direction of chain travel by the cocking carriage 17 to rotate the stop lever 60 and discharge feed from the tubes 42, the linkage 75 is also rotated by the loop 76.

Movement of the linkage 75 by the cable 18 is effective to raise a pair of flush valves 77 which normally block a pair of openings 78 leading to the discharge conduits 70. Preferably, the flush valves 77 are of the self-rising type and once they are raised slightly, they do not reseat over openings 78 until all of the water is discharged from the tank 21. Each of the flush valves 77 is mounted on a guide rod 79 which extends upwardly through an opening in a guide bracket 80 mounted on the tank. The linkage 75 is generally T-shaped and is journalled at its lower end in a pair of clamps 81 on the guide bracket adjacent the guide rods 79. The upper ends of the guide rods carry washers 82 adjustably positioned by nuts 83. Short lever arms 84 are secured to the cross bar of the T-shaped linkage so that as the linkage is moved by the cable 18, the lever arms raise the washers 82, guide rods 79 and lift the flush valves 77 off their seats. When the cable 18 is returned to its original position by the weight 19, the lever arms 84 lower the washers and after the water has all been discharged from the tank 21, the flush valves 77 reseat on the openings 78.

To facilitate the mixing action of the feed and water as it is discharged from the lower end of the cone 22, the cone is located slightly off the center of the trough T and the mixture is directed on a deflector plate 85 mounted in the trough T. The deflector plate 85 causes the liquid feed mixture to swirl up in the trough thereby enhancing the mixing action. On the opposite side of the trough a splash plate 86 may be desirably installed to prevent the liquid feed from splashing out of the trough. It will also be understood that animals may be fed from either side of the trough and that the animals on one side of the trough may be separated from those on the other side by means such as a zigzag fence F.

*Balancing arm adjustment*

It is a further important feature of the present invention that the weight of feed to be deposited by each weighing unit 16 can simply and conveniently be changed. To control the amount of feed in the tube 42, which is effective to trip the balancing mechanism 50, a movable weight 90 is mounted at a selected position along the balance arm 51. Since the balance arm pivots on the pin 53, it will be appreciated that the weight 90 exerts its force through a moment arm determined by the horizontal distance that its center of gravity is located from the pivot pin 53. On the other hand, the weight of the drop tube 42, through the depending links 43, exerts its force through a much shorter lever arm defined by the horizontal distance between pivot pins 53 and 55. Therefore, a relatively small movable weight 90 is effective to control the weighing of relatively large amounts of feed which are deposited in the weighing tube 42. In addition, by simply moving the weight 90 on the balance arm 51, thereby changing its moment arm, the balancing mechanism 90 is also effective to precisely control a wide range of weights including very small quantities of feed.

So that the proper amount of feed can be selected, the balance arm 51 is marked with calibrations 91 evenly spaced along its length. The extreme right calibration marking 91, as shown in FIG. 7, is the zero weight marking. In other words, when the weight 90 is selectively indexed adjacent the right-hand calibration, the feed weighing unit 16 is in a balanced condition. By moving the weight 90 slightly to the right of the zero calibration the tube 42 drops since its weight overcomes that of the weight 90 in this position. Conversely, positioning the weight 90 progressively farther to the left on the balance arm 51 correspondingly increases the amount of feed which must be deposited in the tube 42 before it overbalances the weight and trips the balancing mechanism.

Provision has also been made for adjusting each weighing unit 16 for accuracy so that the feed deposited corresponds to the selected weight. In adjusting the balance arm 51, the weight 90 is first set at the zero calibration. Then an auxiliary weight 92, located on the outer end of the balance arm 51, is positioned to exactly balance the weight of the drop tube 42 and its linking mechanism. To adjust the full scale reading, the weight 90 is then indexed adjacent the extreme left calibration 91 on the scale arm 51 and a weight equivalent to the full scale reading is hung on the bottom of the drop tube 42. The length of an adjusting screw 93 on the auxiliary weight 92 is varied to select the vertical position of the balance arm 51 respective to the upper portion of the frame 41.

By adjusting the stop screw 93 to decrease its length, the end of the balance arm will come to rest closer to the frame 41 and thereby decrease the horizontal component of the lever arm for the weight tube 42. If the assembly does not trip when the weight 90 is set at the full scale reading and an equivalent weight is placed on the drop tube 42, the adjusting screw 93 is lengthened so that the scale arm 51 is raised and the drop tube lever arm is increased to a point where the assembly will trip at this setting. By repeating the zero scale setting and the full scale setting until both are accurate, all of the intermediate scale calibrations 91 will also be accurate since the calibrations are evenly spaced. It will also be appreciated that as a result of this simple adjusting arrangement the individual components of the weighing unit 16 may be manufactured from standard construction elements or parts without the necessity of extreme precision or accuracy.

To permit even greater control of the dry feed discharge from the weighing tubes 42, the discharge doors 44 may be elongated and provided with feed flow dividers 95. As shown in FIGS. 9 and 10, the dividers 95 are preferably formed in the shape of upstanding wedges so as to separate the feed sliding down the inclined open doors 44 into two portions and direct the feed outwardly from the lower corners of the doors. Desirably, the dividers 95 are adjustably located on the doors such as by bolts 96 insertable through any one of a plurality of openings 97 in the doors. In this way, unequal but closely controlled portions of the feed in the tube 42 may be directed into a plurality of livestock pens at a single feeding station. In the illustrated embodiment, a central tube divider 98 is disposed in the tube 42 to facilitate the flow of feed out through the two side opening doors 44 and to prevent feed from accumulating on the hinged portions of the doors.

Fast-breaking rolling pivots

It is also a feature of the present invention that the arrangement of the pivot pins 53 and 55 in the bracket 52 provides fast breaking movement when the balancing mechanism 50 is tripped. In other words, as soon as the weight of the tube 42 and the feed deposited therein exceeds the preselected value, the counterclockwise movement of the bracket 52 acts to increase the load moment arm of the tube 42 about the pin 55, while the clockwise weight moment arm of the balance arm 51 is simultaneously decreasing. This fast breaking action serves to provide sufficient downward momentum to insure that the door 46 is closed blocking the flow of feed from the conveyor 12 into the tube 42. (See FIGS. 5 and 6)

To further assist the fast breaking action and to overcome the starting inertia incident to tripping the balancing mechanism 50, the pins 53, 55 and 57 are constructed to serve as rolling pivots for the corresponding members which are attached thereto. Referring to FIGS. 11–13, the preferred construction of each of these rolling pivots is illustrated. The upper end of the link 43, for example, defines a generally square shaped hook 101 having a horizontal top portion 102 substantially wider than a reduced journal portion 103 of the pin 55 which supports the link. With the weighing mechanism in the cocked position as shown in the solid line illustration of FIG. 5, the pin 55 is located near the left-hand end of the flat top 102.

As the balancing mechanism 50 is tripped the counterclockwise movement of the end bracket 52, to which the pin 55 is rigidly secured, causes the pin to rotate in a counterclockwise direction and thus roll to the right. In short, this reduces the friction between the link 43 and pin 55 from the ordinary sliding friction of a simple journal connection to rolling friction during the initial counterclockwise movement of the tripping mechanism. After the pin 55 rolls to the end of the top 102, of course, sliding friction takes over. But, at this point, due to the increasing counterclockwise moment arm there is sufficient momentum to overcome the friction.

In similar fashion, each of the straps 56 is provided with a slot 104 having a flat portion 105 substantially wider than the pivot pin 57. This construction permits rolling pivotal movement between the flat portion 105 and the pin 57 at the beginning of the tripping action to close the door 46. Similar rolling pivots may be provided for the pin 59 and trip member 58 if desired.

In the embodiment illustrated in FIG. 13, the construction of the rolling pivot for the pin 53 is somewhat different, but the principle is the same. The pin 53 is loosely mounted in the inverted U-shaped bracket 54 on a pair of hardened cross pins 106 on which the pin 53 may roll. The U-shaped bracket 54, of course, defines a space substantially wider than the pin 53 to accommodate this rolling action. In addition, the pin 53 may be formed with an annular groove 107 adjacent one of the cross pins 106 so as to laterally locate the pin 53 in the bracket 54. In this way, rubbing metal-to-metal contact between other parts of the balance mechanism 50 can be greatly reduced.

Cocking carriage

Turning now to FIGS. 14–17, the illustrative cocking carriage 17 is shown mounted on the conveyor tube 12 for tripping and recocking each of the weighing units 16 at the beginning of each feed distributing cycle. The cocking carriage 17 comprises a generally channel-shaped slide frame 110 which overlies the conveyor tube 12 and is retained in position by means of a lower mounting plate 111 secured to the frame 110 by bolts 112. Pivotally mounted from the upper rear portion of the frame 110 is a hook member 113 which is adapted to engage the drag chain 32 as shown in FIG. 14. The actuating cable 18 is coupled to the rear portion of the cocking carriage 17 and extends rearwardly over the conveyor tube 12 past each of the weighing units 16 and terminates adjacent the storage bin 11 suspending the weight 19. The short trip cables 65 interconnect the actuating cable 18 and the balancing mechanism 50 of each of the weighing units 16.

To discharge and recock the weighing units 16 at the beginning of each feeding cycle, the hook 113 engages the drag chain 32 pulling the cocking carriage 17 forward and drawing the actuating cable 18 in the direction of chain travel. As the actuating cable 18 moves forwardly, each of the trip cables 65 pull the stop levers 60 from the stop position, shown in dash lines in FIG. 5, to the tripped position shown, in solid lines, in FIG. 6. Further movement of the actuating cable 18 recocks the balance mechanisms 50 as shown in dash lines in FIG. 6. Once the balancing mechanism are cocked, of course, the weights 90 hold the weighing units 16 in readiness until sufficient feed has been deposited by the conveyor 12 to trip the balancing mechanisms 50 and block the openings 35 during the feed distribution cycle.

To raise hook 113 after the weighting units 16 have been recocked, a cross pin 114 mounted transversely across the conveyor tube 12 engages a cam surface 115 formed on the forward end of the hook. The hook 113 is thus cammed upwardly and out of engagement with the drag chain 32. The cross pin 114 is located sufficiently forward of the starting position of the carriage 17 so that all of the weighing units 16 are cocked prior to disengaging the hook.

When the hook 113 is disengaged from the drag chain 32, the weight 19 at the opposite end of the actuating cable 18 serves to draw the cocking carriage 17 rearwardly on the conveyor tube 12 against a stop pin 116 at the starting position shown in FIG. 14. This places the cocking carriage 17 in a position of readiness for tripping and recocking the weighing units 16 at the beginning of the next operating cycle.

For holding the hook 113 in raised position allowing the drag chain 32 to distribute feed to the weighing units 16, a solenoid 120 is mounted on the cocking carriage 17 and coupled to the hook 113 by a link 121. When the solenoid 120 is energized, the link 121 is drawn upwardly and holds the hook 113 in the raised position shown in the upper dash line position of FIG. 14. On the other hand, when he solenoid is deenergized, the hook 113 is dropped into engagement with the chain 32.

In the preferred embodiment, actuation of the solenoid 120 is controlled by a microswitch 122 which is mounted on the cocking carriage 17. The switch 122 is closed and the solenoid 120 is energized holding the hook 113 in the raised position after the hook 113 is initially raised by the cam pin 114. When the time clock 14 terminates the feeding cycle, the hook again falls into engagement with the drag chain 32 ready to pull the cocking carriage forward at the beginning of the next cycle.

The control circuit

Referring now to FIG. 18, there is shown a schematic wiring diagram of the control circuit for the feed weighing and distributing mechanism of the present invention. The timing clock 14 is driven by electric line voltage supplied through supply wire 125 and 126. A pair of starting contacts 127 and 128 located in the timer 14 are closed by a cam operator 129 at preset intervals during the timing cycle. Closing the contacts 127, 128 energizes the chain drive motor 13 through wires 130 and 131, provided that the bin level switch 15 is closed indicating sufficient feed in the storage bin 11 for the feeding cycle.

The cam operator 129 of timing clock 14 preferably holds the contacts 127, 128 in closed position for an interval of approximately ten minutes or just long enough to complete the feeding cycle. In the present arrangement, when the hook 113 is in the raised position, the solenoid 120 remains energized by the microswitch 122. The switch 122 is connected in series with the solenoid 120, and the solenoid is connected in parallel with the drive motor 13. Accordingly, at the end of the feed distributing cycle when the time clock contacts 127, 128 open, this deenergizes both the motor 13 and the solenoid 120 dropping the hook 113 and opening the contacts of the microswitch 122. The circuit is then in condition for reenergization at the next preselected time when the timing cam operator 129 closes the contacts 127, 128.

Provision has also been made to allow manual operation of the starting mechanism so that a livestock producer may initiate the feeding cycle and observe the entire feed weighing and distributing machanism in operation. Manual starting is initiated by a push button switch 132 located on the housing of the timer 14. Depressing the switch 132 closes switch contacts 133 and 134 and energizes the chain drive motor 13 through lines 130, 131. The switch 132 is retained in its closed position until all of the weighing units 16 are tripped by the cocking carriage 17 and weighing units are refilled by the conveyor.

Operation and use

From the foregoing it will be appreciated that the novel feed weighing and liquid distributing mechanism 10 may be used to weigh and distribute accurately controlled portions of feed in either dry or liquid form at a plurality of livestock feeding stations. Each of the individual weighing units 16 can be set to discharge a predetermined weight of feed. Furthermore, the weighing units can all be tripped at the same time to achieve surprise feeding or the units can be arranged to trip in sequence as they are filled from the conveyor.

When the feed is distributed at the feeding stations in liquid form, water from the tanks 21 is discharged into the mixing cones 22 to intermingle with the dry feed discharge from the weighing tubes 42. The water tank discharge valves are preferably controlled by the weighing unit tripping mechanism. This arrangement permits the water to be discharged slightly ahead of the dry feed to thoroughly wet the inner surface of the mixing cones. In addition, the discharge of water may also continue slightly longer than the discharge of dry feed so that the water flushes all of the feed from the inside of the mixing cones at the end of each discharge cycle.

A further feature of the novel liquid dispensing units 20 is that they permit water soluble additives, such as nutritional supplyments or medicants to be fed to the livestock in the liquid feed. These additives can be easily dropped, either manually or automatically, into the water tanks 21 at all or selected ones of the feeding stations. Since the amount of water in each tank is predetermined, it is a simple matter to insure that the livestock obtained the desired dosage of water soluble additives in their feed.

In similar fashion, the proper amounts of basic feed can be fed to the livestock since the individual weighing units 16 can be easily and accurately adjusted to correctly weigh and discharge the desired quantity of feed to each feeding area or station. Moreover, the entire weighing and distributing cycle is automatically controlled and the livestock can be fed small controlled portions of feed as many times during the day as desired in order to achieve the maximum growth rates.

It will also be appreciated that the novel feed weighing and distributing mechanism 10 may be simply and easily constructed using elements produced on a mass production basis. The quick tripping action of the novel balancing mechanisms 50 also insures accurate and troublefree operation, and can be quickly and simply adjusted to accurately weigh the desired amount of feed.

I claim as my invention:

1. A livestock feed weighing and distributing mechanism comprising, in combination, a feed weighing tube, a conveyor having an opening therein for distributing feed into said tube, balancing means associated with said tube for sensing a preselected weight of feed therein, means for retaining feed in said tube until said preselected weight is sensed, means coupled to said balancing means for closing said opening when said preselected weight is sensed, trip means associated with said balancing means and said retaining means for discharging said preselected weight of feed from said tube, a generally funnel-shaped cone disposed to receive the feed discharged from said tube, means defining a source of fluid disposed adjacent said weighing tube, and valve means for discharging fluid from said source into said mixing cone when said feed is discharged from said tube.

2. The combination according to claim 1 wherein said source of fluid includes a water tank having a float operated supply valve located in a water supply line coupled to said tank, said float operated supply valve being adjustable to selectively regulate the amount of water supplied to said tank from said supply line.

3. The combination according to claim 1 wherein said discharge valve is self-rising in the water in said tank upon being initially tripped so that said discharge valve does not reseat until after all of the water in said tank above a predetermined level has been discharged therefrom.

4. The combination according to claim 1 including a pair of discharge tubes interconnecting said fluid source and the top of said cone, said discharge tubes each having a deflector nozzle at the exit end thereof, said nozzles being located at oppositely disposed points at the top of said cone so as to direct the flow of fluid therefrom down and around the inner surface of said cone.

5. The combination according to claim 1 wherein the exit end of said cone is disposed within a feeding trough to one side of the longitudinal center line thereof and an inclined deflector plate is located in said trough below said exit end so as to enhance the thorough mixing of said feed and water.

6. A livestock feed weighing and distributing mechanism for serving a plurality of livestock feeding stations comprising, in combination, a container for storing feed, a conveyor for distributing the stored feed to said feeding stations, a feed weighing tube mounted adjacent said conveyor at each of said feeding stations, said conveyor having an opening therein at each station for depositing feed into each of said tubes, balancing means for sensing a preselected weight of feed in each of said tubes, means for blocking said openings when said preselected weight of feed is sensed, each of said weighing tubes including means for retaining feed deposited from said conveyor in said tube until said preselected weight is sensed, said retaining means being coupled to a trip linkage associated with said balancing means for discharging the preselected weight of feed from said tube, said retaining means including a pair of side opening doors hinged to the bottom portion of the tube and said trip linkage interconnecting each of said doors with said balancing means, said side opening doors extending outwardly from said tube, and a wedge-like feed flow divider is adjustably mounted on the outer portion of said doors to selectively separate the feed discharged from each door into discrete portions.

7. The combination according to claim 6 wherein said opening is formed in the bottom of said conveyor and said blocking means is pivotally mounted on said conveyor so as to selectively close said opening, said tube being suspended from said balancing means for limited vertical movement with respect to said conveyor, and a closing linkage interconnects said tube and said blocking means for closing said opening when said tube is moved downwardly by said balancing means.

8. A livestock feed weighing and distributing mechanism comprising, in combination, a feed weighing tube, a conveyor having an opening therein for distributing feed into said tube, balancing means mounted on a frame member supported on said conveyor for sensing a preselected weight of feed deposited into said tube, said balancing means including a balance arm pivotally mounted in a bracket secured to said frame, a weight selectively positionable on said balance arm, a depending link pivotally mounted on said balance arm at a point spaced horizontally from said pivotal mounting of said balance arm in a direction away from said weight, said weighing tube being supported by said depending link whereby said balance arm and weight are raised upon said weighing tube receiving said preselected weight of feed from said conveyor, means coupled to said balancing means for closing said opening when said preselected weight of feed is sensed, each of said pivotal mountings of said link on said balance arm and said balance arm on said bracket including a pivot pin, and at least one of said pivot pins disposed for limited rolling movement with respect to a horizontal surface portion of said respective pivotal mounting whereby starting friction is minimized when said balance arm begins to rise.

9. The combination according to claim 8 wherein said balance arm is provided with a zero, a maximum, and a plurality of intermediate calibrations evenly spaced thereon, said balance arm having an auxiliary tare weight adjustably mounted thereon outwardly of said maximum calibration, said tare weight being positionable on said arm to accurately balance said arm when said selective weight is positioned adjacent said zero calibration.

10. The combination according to claim 9 wherein said tare weight is provided with adjusting means for vertically positioning said balance arm when said arm is at rest, said adjusting means being effective to accurately balance said arm when said selective weight is positioned adjacent said maximum calibration and a weight corresponding to said maximum calibration is attached to said weighing tube.

11. A livestock feed weighing and distributing mechanism comprising, in combination, a feed weighing tube, a conveyor having an opening therein for distributing feed into said tube, balancing means mounted on a frame member supported on said conveyor for sensing a preselected weight of feed deposited into said tube, said balancing means including a balance arm pivotally mounted in a bracket secured to said frame, a weight selectively positionable on said balance arm, a depending link pivotally mounted on said balance arm at a point spaced horizontally from said pivot mounting of said balance arm in a direction away from said weight, said weighing tube being supported by said depending link whereby said balance arm and weight are raised upon said weighing tube receiving said preselected weight of feed from said conveyor, means coupled to said balancing means for closing said opening when said preselected weight of feed is sensed, a pivotally mounted door on the lower end of said weighing tube for retaining said preselected weight of feed therein, said depending link interconnecting said balance arm and said door, stop means associated with said balance arm, said stop means being selectively positionable to arrest the rising movement of said balance arm when said preselected weight of feed is sensed and said closing means is actuated said stop means being selectively movable to another position for permitting said balance arm to rise to a higher position than said arrested position, and means for limiting the downward movement of said tube when said balance arm is raised to said higher position whereby said depending link pivots said door open discharging the preselected weight of feed from said tube.

12. The combination according to claim 11 wherein said stop means includes a stop lever pivotally mounted on said balance arm, and a spring interposed between said stop lever and said balance arm biasing said stop lever to a forward position with respect to said balance arm, said stop lever having an adjustable stop bolt thereon adapted to engage said frame and arrest the rising movement of said balance arm when said stop lever is in said forwardly biased position.

13. The combination according to claim 12 wherein said stop lever is movable to a rearward position against the bias of said spring permitting said balance arm to rise to a higher position than said arrested position, said weighing tube having a pivotally mounted door on the lower end thereof for retaining said preselected weight of feed in said tube, said depending link interconnecting said door and said balance arm and means for limiting the downward movement of said tube when said balance arm is raised to said higher position whereby said depending link pivots said door to open position discharging the preselected weight of feed from said tube.

14. The combination according to claim 13 wherein means are provided for locking said stop lever in said rearward position against the bias of said spring, whereby said balance arm rises in response to said tube receiving said preselected weight of feed from said conveyor and said depending link descends opening said door discharging the preselected weight of feed from said tube.

References Cited by the Examiner

UNITED STATES PATENTS

| | | | |
|---|---|---|---|
| 688,807 | 12/1901 | Young | 177—112 |
| 1,759,352 | 5/1930 | Hart | 119—56 X |
| 2,995,783 | 8/1961 | Lytton | 177—114 |

SAMUEL KOREN, *Primary Examiner.*

HUGH R. CHAMBLEE, *Examiner.*